R. W. AVERITT.
HEATER.
APPLICATION FILED OCT. 23, 1916.
1,253,118.
Patented Jan. 8, 1918.
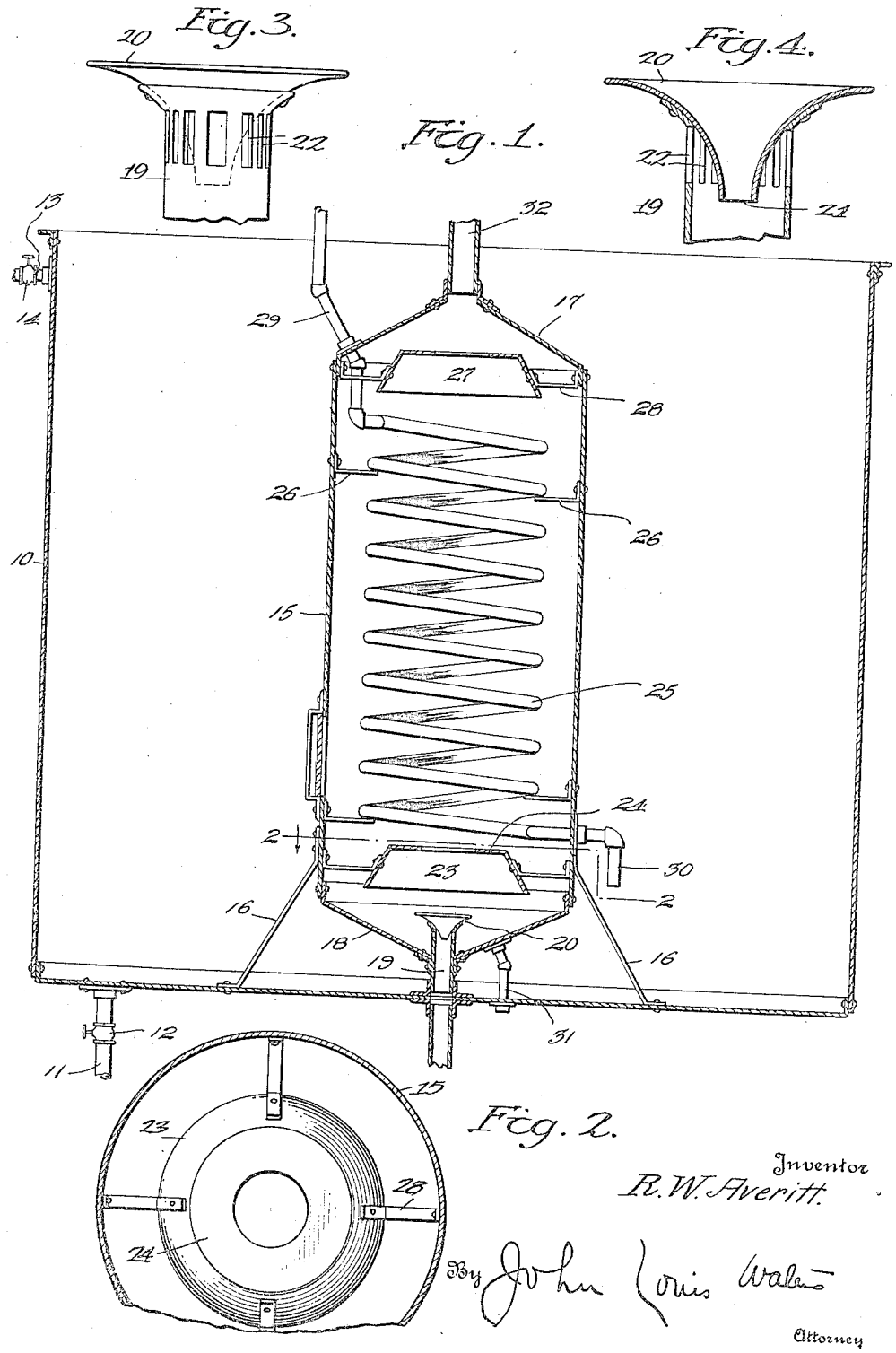

UNITED STATES PATENT OFFICE.

ROBERT W. AVERITT, OF FORT WORTH, TEXAS.

HEATER.

1,253,118.   Specification of Letters Patent.   Patented Jan. 8, 1918.

Application filed October 23, 1916. Serial No. 127,218.

*To all whom it may concern:*

Be it known that I, ROBERT W. AVERITT, a citizen of the United States, residing at Fort Worth, in the county of Tarrant and State of Texas, have invented certain new and useful Improvements in Heaters, of which the following is a specification.

The present invention relates to an improved heater for heating water, or other fluids, and aims at the provision of a device for utilizing waste exhaust steam or gases to raise the temperature of the water.

Another object of this invention is to provide a heater of this character which is of such construction that it may be economically manufactured from stock material, such as sheet iron and piping, and it may be readily installed as an addition or part of a laundry, or other apparatus where heated water is desired, and where steam and internal combustion engines are employed.

Other objects and advantages, as well as those above enumerated, will be more particularly brought out in the following specific disclosure of the present preferred embodiment of the invention, the same being illustrated in the accompanying drawings, wherein, Figure 1 is a vertical central section taken through a heater constructed according to the present invention.

Fig. 2 is a transverse section taken on the line 2—2 of Fig. 1, showing a top plan view of the lower baffle and the inlet nozzle.

Fig. 3 is a detail enlarged side elevation of the inlet nozzle.

Fig. 4 is a vertical sectional view through the nozzle on the scale of Fig. 3.

Referring to these drawings, wherein like parts are designated by similar characters of reference throughout the several views, 10 designates a relatively large tank or receptacle preferably made from sheet metal and having an open top. The tank is adapted to contain water, or other fluid to be heated, and has in its bottom a drain pipe 11 provided with a valve 12 by means of which water may be emptied from the tank. A second outlet pipe 13 is located preferably in one side of the tank 10 adjacent to the top thereof, the outlet of water through the pipe being controlled by a valve 14.

Located substantially centrally within the tank 10 is a heating drum 15, the same being spaced above the bottom of the tank and supported by supporting arms 16. The upper and lower heads 17 and 18 of the drum are of substantially conical form and extend outwardly from the opposite ends of the drum. The lower head 18 carries an inlet nozzle 19 which projects downwardly through the bottom of the tank 10 and is adapted for communication with the exhaust of an engine, or the like to receive steam, hot exhaust gases, or other fluids adapted to heat the interior of the drum 15.

As shown to advantage in Figs. 3 and 4 of the drawings, the nozzle 19 has an upper open end into which projects the reduced extremity of a bell shaped spreader 20 having a relatively small central opening 21 through which a small quantity of the heated steam may pass. The upper end of the nozzle 19 is otherwise blocked. The nozzle, however, is provided with a plurality of lateral openings 22 located immediately beneath the spreader 20 and through which the blocked steam may pass, the upper end of the spreader deflecting the steam toward the opposite sides of the drum 15.

To further insure the distribution of the steam throughout the drum, a baffle 25 is placed in the lower part of the drum in slightly spaced relation above the inlet nozzle. From Figs. 1 and 2, it will be noted that the baffle comprises a substantially frusto-conical member having an inwardly extending flange or ledge 24 at its upper edge providing a deflecting plate to deflect the steam downwardly within the baffle and outwardly about the lower edge of the same. This deflecting flange 24 provides a central opening through the baffle to permit an upward passage of a small quantity of the steam. The steam deflected from the baffle passes upwardly against the opposite sides of the drum 15, heating the drum and heating any water in the tank 10 that may surround the drum. A vertically disposed coil 25 is mounted in the drum 15 and held in place by straps 26 which project inwardly from the sides of the drum. Above the coil 25 is placed an upper baffle 27 of substantially the same construction as that of the lower baffle 23. The baffles 23 and 27 are of a diameter considerably less than that of the drum 15, and are supported concentrically therein by means of radially extending bracket arms 28 having their outer ends riveted or otherwise suitably secured to the inner wall of the drum.

The upper end of the coil 25 terminates in a supply pipe 29 which extends upwardly through the head 17 of the drum and is adapted to be carried upwardly out of the tank 10. This pipe 29 is adapted to receive water from any suitable source, the water passing downwardly through the coil 25 and out of the lower end thereof through the discharge pipe 30 which preferably empties into the tank 10 adjacent to the bottom thereof. The lower head 18 of the drum is provided with a drain pipe 31 which preferably leads through the bottom of the tank 10 to carry off the water of condensation collecting in the bottom of the drum.

In use, the nozzle 19 receives the heating fluid, steam, exhaust hydrocarbon gases, or the like, and the steam passing up through the nozzle 19 strikes the spreader 20 and is deflected thereby toward the sides of the drum 15. The deflected steam, as it rises, strikes the baffle 23 and is spread thereby to a greater extent, and is deflected against the inner wall of the drum. Some of the steam, however, escapes upwardly through the opening 21 in the spreader, and through the central opening in the baffle 23. The steam passes upwardly through and about the coil 25, heating the contents of the coil. As steam reaches the top of the drum 15, it is again deflected laterally by the baffle 27 so as to spread the steam against the upper head 17, arrest the progress of the steam in passing through the drum, and to prevent its free passage through the outlet 32 located in the upper head 17.

Water or the like may be introduced through the pipe 29 for passage through the coil 25, the water emptying from the coil through the pipe 30 into the bottom of the tank 10. If desired, the water or other fluid may be passed upwardly through the coil 15 instead of downwardly therethrough as herein shown.

It is of course understood that various changes and modifications may be made in the above specifically set forth embodiment of this invention, the changes and modifications being restricted only by the scope of the following claims.

What is claimed is:

1. A heater comprising a tank, a drum mounted in the tank, a coil arranged in the drum and opening at one end into the tank and having connection at its opposite end to a source of water supply, said coil being adapted to convey the water downwardly through the coil to the bottom of the tank, an inlet nozzle in the bottom of the drum adapted to inject a heated fluid into the bottom of the drum, a spreader on the inner end of the nozzle, and baffles arranged in the drum for spreading and deflecting the heated fluid about the coil.

2. A heater comprising a tank, a vertically disposed drum mounted in the tank, a steam supply nozzle projecting upwardly through the tank and into the bottom of the drum, a coil mounted in the drum and opening at its lower end into the tank, a supply pipe connected to the upper end of the coil, and means in the drum for spreading and deflecting the steam about the coil and against the walls of the drum to heat the contents of the coil and the water in the surrounding tank.

3. A heater comprising a tank, a drum mounted centrally in the tank, a steam nozzle projecting into the lower end of the drum to inject steam into the same, a spreader on said nozzle for breaking up the stream of steam issuing from the nozzle, a baffle arranged over said spreader to deflect the steam against the sides of the drum, a coil mounted in the drum and opening at its lower end into said tank, a supply pipe communicating with the upper end of the coil and adapted to deliver water to the same, whereby water in said coil may be heated by the steam in said drum and delivered to said tank, and to be further heated by contact with the sides of the drum.

In testimony whereof I affix my signature in the presence of two witnesses.

ROBERT W. AVERITT.

Witnesses:
W. R. BANNER,
T. J. BROWN.

Copies of this patent may be obtained for five cents each, by addressing the "Commissioner of Patents, Washington, D. C."